United States Patent [19]

Steiner

[11] Patent Number: 5,125,724
[45] Date of Patent: Jun. 30, 1992

[54] ROAD VEHICLE HYDRAULIC BRAKE SYSTEM WITH ELECTRONIC BRAKING FORCE DISTRIBUTION CONTROL

[75] Inventor: Manfred Steiner, Winnenden, Fed. Rep. of Germany

[73] Assignee: Mercedes-Benz AG, Fed. Rep. of Germany

[21] Appl. No.: 655,136

[22] Filed: Feb. 5, 1991

[30] Foreign Application Priority Data

Feb. 7, 1990 [DE] Fed. Rep. of Germany ....... 4003579

[51] Int. Cl.⁵ .............................................. B60T 8/34
[52] U.S. Cl. ...................... 303/115 PP; 303/113 TR
[58] Field of Search ........ 303/113 R, 113 TR, 115 R, 303/115 PP

[56] References Cited

U.S. PATENT DOCUMENTS

| | | | |
|---|---|---|---|
| 4,730,877 | 3/1988 | Seibert et al. ................. | 303/115 PP |
| 4,861,119 | 8/1989 | Zirkoviz ......................... | 303/115 PP |
| 4,890,891 | 1/1990 | Leiber ............................ | 303/115 PP |
| 4,940,293 | 7/1990 | Burckhardt et al. ........... | 303/113 TR |
| 4,948,200 | 8/1990 | Leiber et al. .................. | 303/113 R |
| 5,015,043 | 5/1991 | Resch ............................ | 303/113 TR |
| 5,026,124 | 6/1991 | Resch ............................ | 303/113 TR |
| 5,040,852 | 8/1991 | Takata ............................ | 303/114 |

FOREIGN PATENT DOCUMENTS

| | | |
|---|---|---|
| 0233409 | 8/1987 | European Pat. Off. |
| 0292648 | 3/1988 | European Pat. Off. |
| 0305950 | 3/1989 | European Pat. Off. |
| 3633687 | 4/1988 | Fed. Rep. of Germany |
| 3706662 | 9/1988 | Fed. Rep. of Germany |
| 3723916 | 1/1989 | Fed. Rep. of Germany |
| 3728480 | 1/1989 | Fed. Rep. of Germany |
| 3812830 | 7/1989 | Fed. Rep. of Germany |
| 3812831 | 8/1989 | Fed. Rep. of Germany |
| 2509243 | 1/1983 | France |
| 2626230 | 7/1989 | France |
| 2070169 | 9/1981 | United Kingdom |
| 2140112 | 11/1984 | United Kingdom |
| 2141499 | 12/1984 | United Kingdom |
| 2200418 | 8/1988 | United Kingdom |
| 2217413 | 10/1989 | United Kingdom |

Primary Examiner—Joseph F. Peters, Jr.
Assistant Examiner—Christopher P. Ellis
Attorney, Agent, or Firm—Evenson, Wands, Edwards, Lenahan & McKeown

[57] ABSTRACT

A hydraulic brake system for a motor vehicle with rear axle drive and front axle/rear axle brake circuit division is equipped with an antilocking brake system, a traction control device and an electronic braking force distribution control device. In order to effect these regulation and control functions on the rear axle of the vehicle, a pressure modulator is provided which has a modulation chamber connected via brake pressure control valves to the rear wheel brakes. This modulation chamber is separated by a modulator piston from a control pressure space to which the outlet pressure of an auxiliary pressure source can be connected under valve control. The modulator piston is displaced by a return spring into the position corresponding to the maximum volume of the modulation chamber, which is the initial position both for normal braking and for traction control operation. The pressure modulator is dimensioned such that the maximum brake pressure can be built up and also brought down again completely with one single stroke of the piston. The output signal of a position signal generator monitoring the piston position is used as a measure of the brake pressure in the rear axle brake circuit. The output signal of a position signal generator monitoring the pedal position acts as a measure of the brake pressure in the front axle brake circuit.

19 Claims, 2 Drawing Sheets

ROAD VEHICLE HYDRAULIC BRAKE SYSTEM WITH ELECTRONIC BRAKING FORCE DISTRIBUTION CONTROL

BACKGROUND AND SUMMARY OF THE INVENTION

The present invention relates to a hydraulic brake system for a road vehicle with single-axle drive, and, more particularly, to a brake system which uses a pressure modulator to obtain greater sensitivity.

A hydraulic brake system is shown in DE 38 12 830 C2 for a rear-axle drive road vehicle which is also equipped with an antilocking brake system which operates on the front-axle brake circuit in accordance with the known "pump-back" principle and on the brake circuit of driven vehicle wheels in accordance with a pressure modulation principle by changing the volume of a modulation chamber of a pressure modulator connected to the rear axle brake circuit.

The known pressure modulator is also used to actuate a traction control device for a wheel tending to spin, which device operates on a retarding principle, i.e. retarding the spinning wheel by activating its wheel brake. The modulation chamber is connected to and can be shut off or disconnected from the rear wheel brakes by brake pressure control valves individually associated with the rear wheel brakes of the vehicle. These valves are used to control the pressure inlet and pressure outlet. The modulation chamber has pressure-tight and displaceable separation from a drive pressure space of the pressure modulator via a modulator piston.

When the known drive pressure space is subjected to the high outlet pressure of an auxiliary pressure source, the modulator piston can be displaced to reduce the volume of the modulator chamber in order to achieve a build-up of brake pressure to effect the traction control function. The piston can be displaced by pressure relief of this drive pressure space to increase the volume of the modulation chamber to effect the pressure reduction function in antilocking control operation.

In normal braking operation, the brake pressure is built up by actuation of the brake unit, whose outlet pressure is fed to the wheel brakes via (1) a solenoid valve designed as a 2/2-way valve whose basic position 0 is its flow position and whose excited position I is its shut-off position, (2) the modulation chamber and (3) brake pressure control valves by virtue of which the modulation chamber is in communicating connection with the wheel brakes. In normal braking operation, the modulator piston is held in a position corresponding to the minimum volume of the modulation chamber by connection of its drive pressure space to the high pressure outlet of the auxiliary pressure source.

The pressure modulator is configured such that a single piston stroke of the modulator piston, by way of which the modulator piston moves from its end position corresponding to the minimum volume of the modulation chamber into its end position corresponding to the maximum volume of the modulation chamber, is sufficient, even if a brake fluid quantity corresponding to maximum brake pressure has previously been displaced into the wheel brake cylinders, to effect complete removal of pressure. If the piston had been in its position corresponding to the maximum volume of the modulation chamber and was to be displaced into its end position corresponding to the minimum volume of the modulation chamber in traction control operation, the single stroke of the modulator piston is sufficient to build up in the wheel brakes the maximum brake pressure which could be built up by actuation of the brake unit.

In an antilocking brake system operation, the solenoid valve is driven into its shut-off position so that only the wheel brakes are connected, via the brake pressure control valves, to the modulation chamber of the pressure modulator. The brake unit is shut-off by the solenoid valve from the pressure modulator and hence also from the wheel brakes in traction control operation. In order for both antilocking and traction control to be able, if required, to take place in correct phase, i.e. the antilocking control with a pressure reduction phase and the traction control with a brake pressure build-up phase, the modulator piston is held in an intermediate position, e.g. the central position, between its possible end positions. This intermediate position is monitored by an electronic position signal generator and maintained by the electrical triggering of solenoid valves which provide the connection between the drive pressure space and the pressure outlet of the auxiliary pressure source or its pressurized reservoir.

Starting from this central position of the piston, only half the modulation chamber volume, so to speak, is available initially, however, for a pressure reduction phase initiating an antilocking control cycle. As a result, in a situation demanding antilocking control in which the maximum brake pressure in the wheel brake cylinders has been previously built up, an effective antilocking control nevertheless requires a substantial brake pressure reduction to, for example, 10% of this maximum value. This pressure reduction due to the end position corresponding to the maximum volume of the modulation chamber from the intermediate position of the piston only is insufficient for such a pressure reduction.

The foregoing is similarly applicable to traction control operation when the latter demands the build-up of a high brake pressure in the wheel brakes of both driven vehicle wheels. The average value of such pressure is higher than half the maximum pressure which can be built up in the wheel brakes. In order, nevertheless, to permit a complete reduction of pressure at high brake pressures in the course of an antilocking control, a pump-back mode of operation for the pressure modulator is possible in which the pressure modulator pumps back into the brake unit brake fluid accepted previously in a pressure reduction stroke with the solenoid valve open.

Brake pressure reduction in several partial strokes is also possible in a analogous manner in traction control operation. In the known brake system, an electronic force sensor integrated in the modulator piston is provided in addition to the electronic position signal generator recording the piston position. The output of this force sensor is a measure of the brake pressure present in the modulation chamber and hence also in the wheel brakes. In the known brake system, information on the functional state of elements affecting safety in the brake system is gained from the output signal of these two signal generators characteristic of position and pressure, and possibilities are also provided for an electronically controlled pressure metering or pressure reduction to match the particular control situation.

At least the following disadvantages derive from the structural and functional properties of the above-described brake system. Both the antilocking control and the traction control operate sluggishly when, in antilocking operation, high magnitude pressure reductions are necessary and, in traction control operation, when high brake pressures are necessary. This is because there are dead periods associated with the pumpback or replenishing operating phases, and the brake pressure in a wheel brake subject to the control system is necessarily kept constant during these periods.

Frequent control of a functional control valve necessary for positioning the modulator piston in the central position as the initial position for both antilocking and traction control operation increases the wear on this valve and can cause additional susceptibility to faults.

An object of the present invention is, therefore, to improve a known brake system such that, despite simple structure and high reliability, an improvement is achieved in the sensitivity of the possible types of control.

This object has been achieved according to the present invention by holding the piston by a return spring in its position corresponding to the maximum volume of the modulation chamber in the non-actuated condition of the brake system. The modulation chamber is connected to the pressure outlet of the brake unit associated with the brake circuit of the driven vehicle wheels. As soon as the brake system is actuated or the traction control responds, the modulation chamber is shut off from the pressure outlet. On each braking action, the brake pressure build-up in the brake circuit of the driven vehicle wheels takes place via displacement of the modulator piston. An electronic braking force distribution control device operates with monitoring of the piston position and/or the brake circuit of the driven vehicle wheels and with recording of the brake pressure in the brake circuit of the non-driven vehicle wheels or of the position correlated with the non-driven wheels of a functional element of the brake unit. The control device maintains the brake pressure in the brake circuit of the driven wheels, during normal braking operation, in a defined relationship with the brake-pressure fed into the circuit of the non-driven vehicle wheels.

The pressure modulator is used for building up the brake pressure in the brake circuit of the driven vehicle wheels even during normal braking, i.e. braking not subject to a control system, in combination with dimensioning of the pressure modulator. Thus, the maximum brake pressure can be built up in a single stroke of its piston, with the position corresponding to the maximum volume of the modulation chamber being provided as the basic position of the modulator piston.

The piston is in a position, whenever the antilocking control system responds, in which the brake pressure previously connected to the wheel brakes of the driven vehicle wheels can also be brought down completely by a rapid pump-back stroke of the piston.

Similarly, the connection of a maximum brake pressure to one or more of the wheel brake subject to the control system is also possible in a pressure build-up stroke of the piston when the traction control responds. In addition, the brake system according to the present invention also permits control of the brake force distribution, in particular such that an increased contribution of the rear wheel brakes to the total braking force available can be used in the partial braking range.

Another embodiment of a brake system according to the present invention can be effected directly by retrofitting a vehicle equipped with a standard system operating on the pump-back principle with a pressure modulator suitable for traction control and electronic braking force distribution. If the standard antilocking system has brake pressure control valves individually associated with the driven vehicle wheels, no additional solenoid valves are then required. In the situation where the system is configured for control on the "select-low" principle with respect to the driven vehicle axle, usually the rear axle, only one common 3/3-way solenoid valve is needed for the brake pressure control on both wheel brakes, with a 2/2-way solenoid valve connected between the 3/3-way solenoid valve and the wheel brakes. This latter configuration is however, only a relatively small extra requirement.

A pressure modulator having a stepped piston with a smaller diameter step forming an axially movable boundary of the modulation chamber and whose larger diameter step forms an axially movable boundary of the control pressure space of the pressure modulator makes it possible to adapt the pressure modulator, as required, to the outlet pressure level of an existing auxiliary pressure source on the vehicle.

The use of a standard pump-back device configured for an brake system operating on both brake circuits in accordance with the "pump-back" principle overall brake system structure. Because the auxiliary pressure source operates at an outlet pressure level corresponding at least to the brake pressure level, it permits a simple arrangement of the pressure modulator as a pressure transformer and also operation of the control circuit of the pressure modulator with brake fluid as the working medium. As a result, otherwise necessary measures for separating the media between the drive circuit of the pressure modulator and its brake pressure outlet circuit become unnecessary.

It has also been found advantageous to provide safety measures in the form of a pressure limiting valve and opening and closing of a hydraulic control parts under valve control, and for providing pressure feed to the control pressure space of the pressure modulator provided with a throttle, particularly where the auxiliary pressure source can operate at a very high outlet pressure level.

A valve which shuts off the modulation chamber of the pressure modulator from the brake unit in traction control and electronic braking force distribution operation as a solenoid valve has also been found to have safety advantages.

The determination of the brake pressure connected, via the pressure modulator, to the wheel brakes of the driven vehicle wheels by monitoring the position of the modulator piston has the advantage that the output signal, from an appropriate position signal generator, which is characteristic of position, is also a measure of the brake pressure when the wheel brakes are shut off from the modulation chamber and the high outlet pressure of the auxiliary pressure source is connected to the drive pressure space of the pressure modulator. Consequently, the existing pressure in the modulation chamber is substantially higher than that in the wheel brakes.

BRIEF DESCRIPTION OF THE DRAWINGS

These and further objects, features and advantages of the present invention will become more apparent from the following detailed description of two presently preferred embodiments of the invention when taken in conjunction with the accompanying drawings wherein.

DETAILED DESCRIPTION OF THE DRAWINGS

Figure 1:
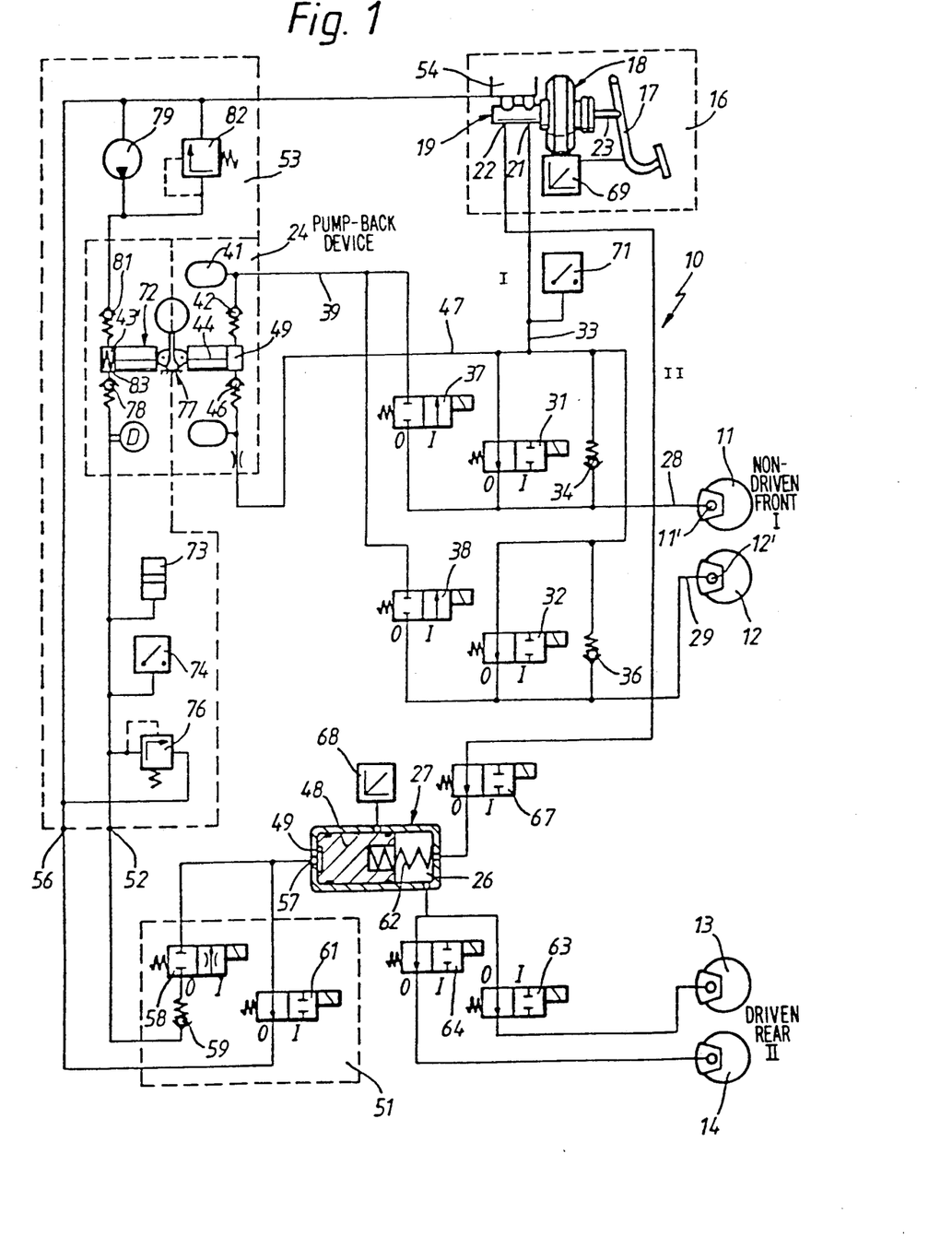
FIG. 1 is a schematic hydraulic diagram of a first embodiment of a braking system according to the present invention in which the control function on the rear axle brake circuit is effected exclusively in accordance with the "pressure modulation" principle.

In FIG. 1, a road vehicle hydraulic twin-circuit brake system is designated generally by the numeral 10. For purposes of explanation, it is assumed that the vehicle has rear-axle drive and that the wheel brakes 11 and 12 of the non-driven front wheels are combined in a static brake circuit I, and the wheel brakes 13 and 14 of the driven rear wheels of the vehicle are combined in a static rear axle brake circuit II, for whose brake pressure supply a brake unit designated generally by the numeral 16 is provided. This brake unit 16 includes a conventional main cylinder 19 which can be actuated by a brake pedal 17 via a brake booster 18, and two pressure outlets 21 and 22 individually associated with the brake circuits I and II.

The main cylinder 19 can be a tandem construction such that the main cylinder has a primary outlet pressure space movably separated at one end by a floating piston against a secondary outlet pressure space, with the second axially movable boundary of the primary outlet pressure space formed by a primary piston on which an actuating rod of the brake booster 18 acts directly. Should the brake booster 18 fail, the brake pedal 17 can be supported directly via the pedal rod 23 on the primary piston, and then the front axle brake circuit I is connected to the pressure outlet 21 of the primary outlet pressure space of the main cylinder 19 and, correspondingly, the rear axle brake circuit II is connected to the pressure outlet 22 of the secondary outlet pressure space of the main cylinder 19.

The vehicle is equipped with an brake system which operates on the front axle brake circuit I in accordance with the generally well-known "pump-back" principle. In accordance with this principle, during the brake pressure reduction phases of the control system, brake fluid drained from one or both of the wheel brakes 11 and/or 12 subject to the control system is pumped back again into the outlet pressure space of the brake unit 16 associated with the front axle brake circuit I by a pump-back device designated generally the number by 24.

On the rear axle brake circuit II, the antilocking brake system operates on the rear wheel brakes 13 and/or 14 in accordance with the generally known "brake pressure alteration" principle by altering the volume of the modulation chamber 26, connected to these rear wheel brakes. The chamber 26 is part of a pressure modulator designated generally by the numeral 27 which is also a central functional element of a traction control system operating on a principle of retarding a driven vehicle wheel tending to spin by activating its wheel brake 13 and/or 14. The pressure modulator 27 is also a central functional element of an electronic braking force distribution control with which the vehicle is equipped, which system operates on the principle of controlling the rear axle brake pressure as a function of parameters such as the front axle brake pressure, loading condition of the vehicle and dynamic condition of the vehicle, i.e. transverse acceleration and longitudinal retardation, such that overall the best possible compromise is achieved between a desired high vehicle retardation and protection of the brake system 10. In particular, an increased contribution of the rear wheel brakes 13 and 14 to the total attainable vehicle retardation is achieved by this electronic braking force distribution control system in the partial braking range. Effecting this function per se by known technical expedients, given knowledge of the objective, is possible for a person of ordinary skill in this art and does not therefore appear to require further explanation.

In order to effect the functions of the above-described function control devices, the brake system 10 is configured as follows. The brake pipe branches 28, 29 leading individually to the front wheel brakes 11, 12 are each connected, via an inlet valve 31, 32 to the main brake pipe 33 of the front axle brake circuit I connected to the pressure outlet 21 of the main cylinder 19.

The inlet valves 31, 32 are, in the illustrated embodiment, 2/2-way solenoid valves whose basic position 0 is the throughflow position in which the pressure outlet 21 of the main cylinder 19 is connected to the wheel brake cylinders 11' and 12' of the front wheel brakes 11 and 12 and whose excited or activated position I is the shut-off position in which the relevant wheel brake(s) 11 and/or 12 is or are shut off from the pressure outlet 21 of the main cylinder 19. A non-return valve 34, 36 is connected in parallel with each of the two inlet valves 31, 32. With these non-return valves, a brake pressure reduction by withdrawal of the brake pedal 17 remains possible in the event of an erroneous function of the particular inlet valve 31 or 32 such as sticking thereof in the shut-off position I.

In addition, the two front wheel brakes 11, 12 are each connected via an outlet valve 37, 38 respectively, to a return pipe 39 which itself is connected to a buffer reservoir 41 whose reservoir capacity corresponds to the maximum brake fluid volume. In a maximum braking situation, that volume can be accepted by the front wheel brakes 11, 12, such that it must be possible to drain the fluid from the front wheel brakes 11, 12 when those brakes need the greatest possible reduction in pressure.

The outlet valves 37, 38 are 2/2-way solenoid valves whose basic position 0 is the shut-off position and whose excited or activated position I, which is associated with the brake pressure reduction operation of the antilocking control system, is the through-flow position in which the wheel brake(s) 11 and/or 12 is or are connected to the return pipe 39 and the buffer reservoir 41.

The return pipe 39 and the buffer reservoir 41 are connected, via an inlet non-return valve 42, to a pump chamber 49 of a first piston pump 44 associated, as part of the pump-back device 24, with the front axle brake circuit I. The pump chamber 49 of this piston pump 44 is connected, via an outlet non-return valve 46, to a pump-back pipe 47 leading back to the main cylinder 19 and to the main brake pipe 33 of the front axle brake circuit I.

The pressure modulator 27 provided for effecting both the and traction control functions and the electronic braking force distribution function is a pressure transformer having a transformer ratio of 1/1 whose modulation chamber, 26 is bounded, pressure-tight and movably, by a modulator piston 48 against a control valve arrangement, designated generally by the numeral 51, alternatively to a high pressure outlet 52 of an auxiliary pressure source designated generally by the numeral 53, or its unpressurized (i.e. held at atmospheric ambient pressure) reservoir 54. In the illustrated embodiment, the brake fluid reservoir of the main cylinder 19 of the brake unit 16 of the brake system 10 functions as the reservoir 54. The relevant low pressure connection of the auxiliary pressure source 53 is indicated by numeral 56.

The functional control valve arrangement 51 includes an inlet control valve 58 connected to a control inlet 57 of the pressure modulator 27. This inlet control valve 58 is connected to the high pressure outlet 52 of the auxiliary pressure source 53 via a non-return valve 59 which is actuated in the opening direction by the relatively higher pressure at this high pressure outlet 52 compared with the control pressure space 49 of the pressure modulator 27 and is otherwise shut off. The inlet control valve 58 is a 2/2-way solenoid valve whose basic position 0 is its shut-off position and whose excited position I is its through-flow position connecting the high pressure outlet 52 of the auxiliary pressure source 53 to the control inlet 57 of the pressure modulator 27. In this through-flow position, the inlet control valve 58 also acts as a throttle which limits a pressure rise in the control pressure space 49 of the pressure modulator 27 to a defined rate. Furthermore, the functional control valve arrangement 51 includes an outlet control valve 61 connected between the control inlet 57 of the pressure modulator 27 and the low pressure connection 56 of the auxiliary pressure source 53. The basic position 0 of this control valve 61 is its through-flow position in which the control inlet 57 of the pressure modulator 27 is connected to the low pressure connection 56 of the auxiliary pressure source 53 and its excited position I is its shut-off position in which the control inlet 57 of the pressure modulator 27 is shut off from the low pressure connection 56 of the auxiliary pressure source 53.

The basic positions 0 of both the inlet control valve 58 and the outlet control valve 61 of the functional control valve arrangement 51 correspond to the non-actuated condition of the braking system 10. Then the control pressure space 49 of the pressure modulator 27 is displaced by a pre-loaded compression spring 62 into the basic position shown, corresponding to maximum volume of the modulation chamber 26 of the pressure modulator 27.

The modulation chamber 26 of the pressure modulator 27 is connected to the rear wheel brakes 13 and 14 by brake pressure control valves 63 and 64, respectively, configured as 2/2-way solenoid valves which function as both inlet and outlet valves. The basic position 0 of each of these brake pressure control valves 63 and 64 is the through-flow position and the excited position I is the shut-off position.

The main brake pipe 66, of the rear axle brake circuit II, emerging from the pressure outlet 22 of the main cylinder 19 and connecting the latter with the modulation chamber 26 of the pressure modulator 27 can be shut off by a further control valve 67 configured as a 2/2-way solenoid valve whose basic position I is its shut-off position. Assuming correct functioning of the brake system and its control valve 67 is switched into its shut-off position I whenever the brake system 10 is actuated or the traction control device starts to function.

The connection of the brake pressure to the rear wheel brakes 13 and 14 takes place both when the brake system 10 is actuated by the driver and in the case of a response of the traction control system. Then, the inlet control valve 58 is switched into its through-flow position I and the outlet control valve 61 is switched into its shut-off position I. The further control valve 67 is also switched into its shut-off position. The control pressure space 49 of the pressure modulator 27 is then subjected to high outlet pressure of the auxiliary pressure source 53 so that a pressure also builds up in its modulation chamber 26 which is now shut off from the brake unit 16. This pressure can be connected in a metered manner via the brake pressure control valves 63, 64 to the rear wheel brakes 13, 14, in that the two valves 63, 64 are, for example, pulse-controlled. Such a pulsed pressure build-up in the rear wheel brakes 13 and 14 can also be achieved by pulse control of the inlet control valve 58 with the outlet control valve 61 closed.

The electronic control valve 61 of the front axle/rear axle braking force distribution takes place, when such a control concept is effected in a desirable manner, in that the rear axle brake pressure is varied relative to the brake pressure fed by the driver into the font axle brake circuit I by actuating the brake unit 16. This relationship can be fixed but can also be effected in a variable manner in a similarly refined embodiment of the control device which provides the braking force distribution in, for example, such a way that dynamic parameters such as vehicle retardation, brake slip, the transverse accelerations acting on the vehicle or the loading condition of the vehicle can be used for computational generation of front axle/rear axle braking force value pairs during braking operation.

The information about the brake pressure $P_{FA}$ on the front axle and the brake pressure connected to the rear wheel brakes 13 and 14 necessary for such a type of follow-up control can be obtained directly by pressure transducers which emit output signals characteristic of the front axle brake pressure $P_{FA}$ at the outlet 21 of the main cylinder 19 and of the brake pressure $P_{HA}$ present in the rear wheel brakes 13 and 14. From these transducer output signals characteristic of the front axle brake pressure $P_{FA}$, if appropriate in combination with more of the parameters mentioned above, the value to which the rear axle brake pressure $P_{HA}$ should be set is determined and the pressure metering for the rear wheel brakes 13 and 14 is controlled by comparing the required value for the rear axle brake pressure determined in this way with its actual value. It is then possible to record the rear axle brake pressure by measuring the pressure in the modulation chamber 26 of the pressure modulator 27 whenever, in the situation where the brake pressure control valves 63 and 64 are in the basic position 0, the brake pressure alteration is controlled by the inlet and outlet control valves 58, 61 of the control valve arrangement 51.

A position signal generator 68 is provided in the embodiment of FIG. 1 to record the actual value of the rear axle brake pressure. This position signal generator 68 generates characteristic electrical output signals for the position of the modulator piston 48. These output signals are, therefore, a measure of the brake fluid volume which has been displaced in each instance into the rear axle brake circuit II and is, therefore also, a measure of the rear axle brake pressure in every instance, i.e. independent of whether the metering of the rear axle brake pressure take place by pulse control of the inlet and outlet control valves 58 and 61 or by pulse control of the brake pressure control valves 63 and 64.

The information about the pressure in the front axle brake circuit I is also obtained from a further position signal generator 69 forming part of the brake unit 16. The output signal from this position signal generator 69 is a measure of the position of the piston, whose motion is coupled to that of the brake pedal 17 and which forms the axially movable boundary at one end of the main cylinder 19 output pressure space associated with the front axle brake circuit I.

Thus, the output signal from this position signal generator is again a measure of the brake pressure present in the front axle brake circuit I. In order to determine a calibration factor taking into account the deaeration state of the brake system 10 and using same for the evaluation of the output signal of the displacement signal generator 69, a pressure switch 71 is provided which generates an output signal on reaching a certain pressure threshold value. Consequently, from the piston position, or pedal position, recorded by the displacement signal generator 69 on the occurrence of this pressure switch output signal, the currently necessary pressure/displacement calibration factor can be determined.

The auxiliary pressure source 53, whose output pressure can be connected into the control pressure space 49 of the pressure modulator 27, is operated with brake fluid as the working medium. The auxiliary pressure source 53 includes generally known, functionally associated components including a pressure reservoir 73 which can be charged to high pressure by a charging pump 72 and whose charging is controlled by a pressure switch 74 monitoring the reservoir pressure. In order to protect the pressure reservoir 73 against overcharging, a pressure limiting valve 76 is provided through which brake fluid is drained into the brake fluid reservoir 54 of the brake system 10 when a critical reservoir pressure value is exceeded.

The second piston pump of a standard pump-back device 24, a brake system operating on both brake circuits of the vehicle in accordance with the "pump-back" principle, is used as the charging pump 72. This second piston pump, together with the piston pump 44 used as the pump-back pump for the front axle brake circuit, has a common eccentric drive 77 with an electric drive motor. An outlet non-return valve 78 prevents brake fluid from flowing back from the pressure reservoir 73 into the pump chamber 43' of the charging pump 72. The supply of brake fluid from the brake fluid reservoir 54 of the brake system 10 to the pump chamber 43' of the precharging pump 72 is provided by a precharging pump 79 having an electrical pump drive and operating at a relatively low pressure level. It is only necessary for the outlet pressure of the pump 79 to be sufficient to overcome the closing force, corresponding to a certain opening pressure, of the inlet non-return valve 81 of the precharging pump 72. A further pressure limiting valve 82 is connected in parallel with the precharging pump 79 in order to limit the precharging pressure level.

The precharging pump 79 is unnecessary if the piston pump used as the charging pump 72 as part of the auxiliary pressure source 53 is not a free piston pump, which is the conventional arrangement in a standard twin-circuit pump-back device 24, but is effected as a self-priming pump indicated diagrammatically by a pump spring 83.

Figure 2:
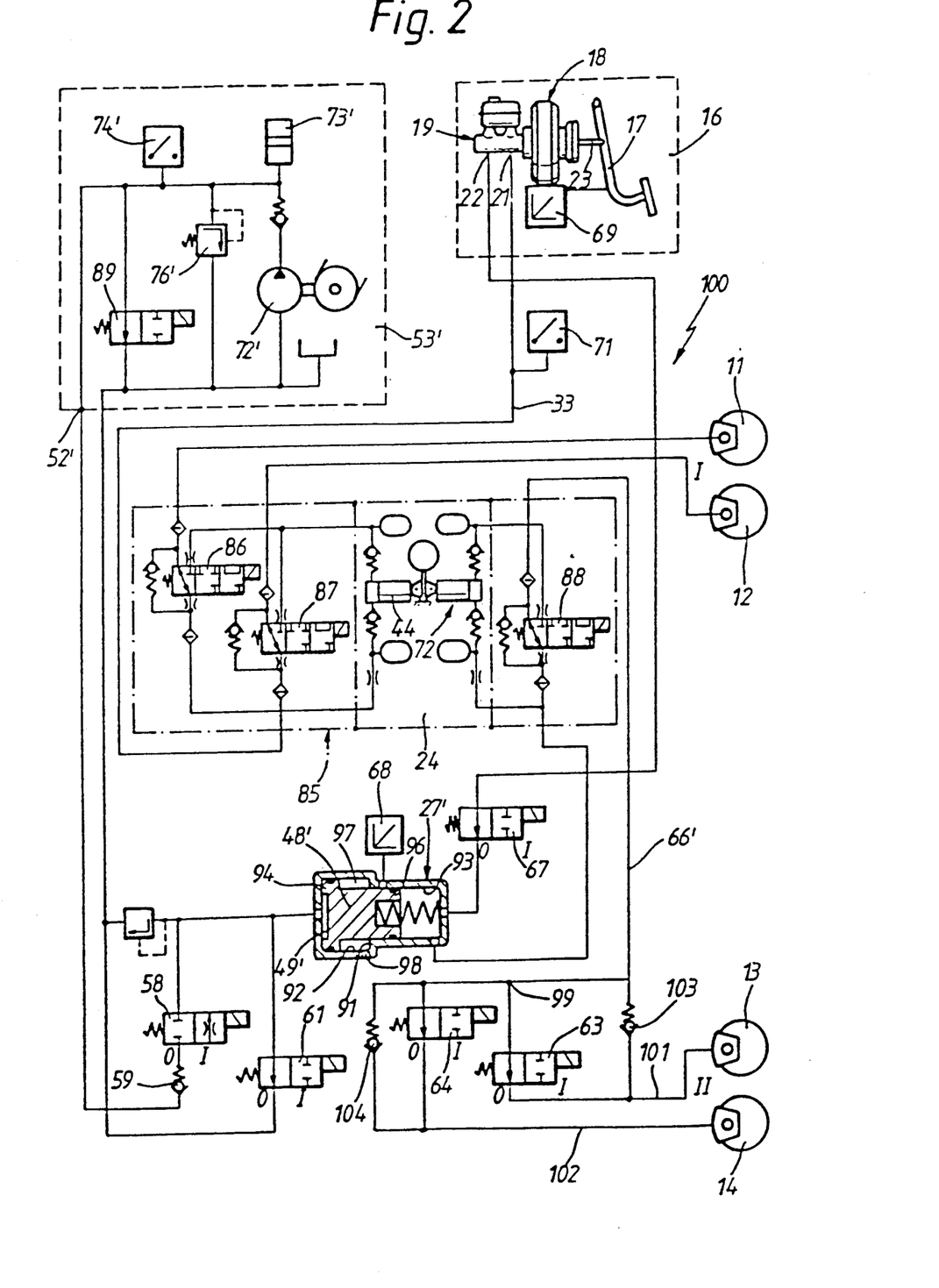
FIG. 2 is a schematic hydraulic diagram of another embodiment of a braking system according to the present invention with control, traction control and electronic braking force distribution, in which the control on the driving axle of the vehicle is effected in accordance with both the "pump-back" principle and the "pressure modulation" principle.

Another embodiment of a brake system 100 in accordance with the present invention is shown in FIG. 2, and is substantially analogous functionally to the above-described embodiment in FIG. 1 so that explanation of the second embodiment can be mainly limited to the structural differences existing relative to the embodiment of FIG. 1. Where the same reference numerals are used in FIG. 2 for functional element of the brake system 100 as are used for functional elements of the embodiment of FIG. 1, this is an indication of structural and functional equivalence or analogy which will be evident to one of ordinary shell in this art, and the reference to the explanation given with respect to FIG. 1 contains the correspondingly indicated functional elements.

In the brake system 100 of FIG. 2, a brake system is provided which operates on the pump-back principle on both the front axle brake circuit I and the rear axle brake circuit II. This system is represented by its hydraulic unit which corresponds to that of a conventional, standard brake system designated generally by numeral 85 operates with individual wheel control on the front axle and common control, i.e. control taking place in accordance with the select-low principle, on the rear axle.

Instead of two 2/2-way solenoid valves being provided as brake pressure control values for each wheel brake as in FIG. I, two-3/3-way solenoid valves 86 and 87 are used for the front wheel brakes 11 and 12 and one 3/3-way solenoid valve 88 is used for the rear axle brake circuit II.

Because, both piston pumps 44 and 72 of the pump-back unit 24 are needed for pump-back operation in the embodiment shown in FIG. 2, a different arrangement of the hydraulic auxiliary pressure source 53' is necessary compared with the embodiment of FIG. 1. In this second embodiment also, operation of the auxiliary pressure source 53' is effected by a pressure reservoir 73', a charging pump 72', a pressure switch 74' and a pressure limiting valve 76' in the switching arrangement as already explained with report to FIG. 1 with respect to the auxiliary pressure source 53 but with differed dimensions of the above-mentioned functional elements shown in FIG. 2.

A simple hydraulic pump, assumed to be permanently driven, is provided as the charging pump 72' of the auxiliary pressure source 53' and operates at a maximum outlet pressure level which is substantially lower than the brake pressures generated by of the brake unit 16.

The pressure modulator 27', which is only required for traction control and braking force distribution control, is correspondingly configured as a pressure intensifier which provides a rise in the auxiliary pressure provided at a correspondingly low level at the outlet 52' of the auxiliary pressure source 53' up to the necessary brake pressure level. In addition, a reservoir charging valve 89 forms part of the auxiliary pressure source 53' and is a 2/2-way solenoid valve whose basic position 0 is its through-flow position in which the charging pump 72' operates in protective circulation mode.

The pressure modulator 27' has two housing bores 92 and 93 of different diameter offset relative to one another joined together by a housing step 91. The modulator piston 48' with piston steps 94, 96 of correspondingly different diameter is guided, pressure-tight and displacably, in these housing bores 92, 93. The larger diameter piston step 94 forms the axially movable boundary of the control pressure space 49' whose axially fixed boundary relative to the housing is formed by an end wall of the modulator housing closing the housing bore 92.

The smaller diameter piston step 96 forms the axially movable boundary of the modulation chamber 26 of the pressure modulator 27', whose dimensions correspond to this extent with the pressure modulator 27 of FIG. 1. By way of an annular space 97 extending between the larger piston step 94 and the housing step 91 and extending to a greater or less extent in the axial direction depending on the position of the modulator piston 48', this annular space being kept unpressurized as shown by a bleed hole 98, separation of the medium is also obtained between the modulation chamber 26 of the pressure modulator 27' filled with brake fluid medium and its control pressure space 49'. This separation is necessary because the auxiliary pressure source 53' is operated with conventional hydraulic oil as the operating medium.

The hydraulic periphery of the pressure modulator 27', which includes the inlet control valve 58, the non-return valve 59 connected upstream of the latter, the outlet control valve 61, the two brake pressure control valves 63 and 64 for the rear wheel brakes 13 and 14 and the further control valve 67, is the same in structure and function as the components designated by the same numerals in FIG. 1. The single brake pressure control valve 88 of the hydraulic unit 85 of the standard brake system associated with the rear axle brake circuit II is connected between the modulation chamber 26 of the pressure modulator 27' and the branch position 99 of the rear axle brake pipe 66', from which emerge the brake pipe branches 101, 102 leading to the rear wheel brakes 13 and 14. These brake pipe branches 101, 102 can be shut off individually or in common by the brake pressure control valves 63, 64 configured as 2/2-way solenoid valves and individually associated with the rear wheel brakes 13, 14.

Because of the series connection of the pressure modulator 27' and the conventional brake system hydraulic unit 85 in FIG. 2, a particularly simple control logic is possible, in principle in any event, for the electronic braking force distribution control. The control pressure space 49' of the pressure modulator 27' is permanently subjected to the high outlet pressure of the auxiliary pressure source 53' during a braking operation, and brake pressure control takes place on the rear wheel brakes 13, 14 via the control system 85 which, including its electronic control unit (not shown), requires no modification. With this simplest possible type of braking force distribution control, the position signal generator 68 provided for the brake pressure metering to the rear wheel brakes 13, 14 becomes, at least in principle, unnecessary.

Because of the hydraulic redundancy provided in terms of the control function, which is possible both by virtue of the hydraulic unit 85, considered in itself, and by the pressure modulator 27', it is possible for brake pressure to be reduced in the rear wheel brakes 13, 14 via the functionally corresponding brake pressure control valve 88 of the brake system hydraulic unit 85 even in the case of malfunctioning of the outlet control valve 61, i.e. if the latter sticks in its shut-off position.

In order to permit reduction of brake pressure in the rear wheel brakes 13, 14 in the case of an erroneous function of the brake pressure control valves 63, 64, it is necessary to provide non-return valves 103, 104 connected in parallel with each of these brake pressure control valves 63, 64, respectively.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. In a road vehicle having single-axle drive with a static front axle brake circuit and a static rear axle brake circuit each connected via a main brake pipe to a pressure outlet of a main cylinder, a hydraulic brake system is configured to operate at least on the brake circuit associated with driven vehicle wheels in accordance with brake pressure alteration by volume alteration to a modulation chamber of a pressure modulator selectively operatively connected to wheel brakes of the brake circuit of driven wheels and disconnected from the driven wheels brakes by one of brake pressure control valves and a functional control valve to a brake unit pressure outlet associated with the driven wheel brake circuit wheel for actuating the brake system and a traction control device adapted to operate by retarding a vehicle wheel tending to spin through actuation of its associated wheel brake, the hydraulic brake system comprising an auxiliary pressure source, the pressure modulator having a piston arranged pressure-tight and displacable in a modulator housing for separating a control pressure space from the modulation chamber such that the control pressure space is subjected, in a valve-controlled manner, to one of an outlet pressure of the auxiliary pressure source and to an unpressurized reservoir of the auxiliary pressure source, whereby the piston is displaced to reduce and increase the volume of the modulation chamber to effect traction control and, when the piston carries out a stroke causing a change in brake pressure for one of brake control and the traction control, the modulation chamber is disconnected from the brake unit, the maximum volume alteration stroke which the modulator piston is adapted to execute is dimensioned so that the modulation chamber can accept in a single brake pressure reduction stroke a total brake fluid quantity to be displaced into the brake circuit of the driven vehicle wheels in order to develop a maximum brake pressure, wherein the brake system is configured such that (a) in the non-actuated condition of the brake system the piston is held by a return spring in a position corresponding to the maximum volume of the modulation chamber, the modulation chamber being connected to the pressure outlet of the brake unit associated with the brake circuit of the driven vehicle wheels such that, as soon as one of the brake system is actuated and the traction control responds, the modulation chamber is disconnected from the associated pressure outlet;

b) on each braking action, the brake pressure build-up in the brake circuit of the driven vehicle wheels is effected by displacement of the modulator piston; and c) an electronic braking force distribution control device is configured to monitor at least one of the piston position and the brake pressure in the brake circuit of the driven vehicle wheels and record one of the brake pressure in the brake circuit of the non-driven vehicle wheels and of the position of a functional element of the brake unit, correlated with the non-driven wheels brake circuit brake pressure, such that, in normal braking operation, the brake force distribution control device maintains the brake pressure in the brake circuit of the driven wheels in a defined relationship with the brake pressure fed into the brake circuit of the non-driven vehicle wheels.

2. The brake system according to claim 1, wherein the antilocking brake system is operatively arranged for pump-back operation on both the front axle brake circuit and the rear axle brake circuit the pressure modulator is connected between the brake unit and a functional part of the hydraulic unit of the antilocking brake system associated with the rear axle brake circuit to the main brake pipe of the rear axle brake circuit, and brake pressure control valves individually associated with the rear wheel brakes of the vehicle are provided to control brake pressure build-up, brake pressure retention and brake pressure reduction phases of the traction control device and the electronic braking force distribution control device, and are connected between the rear wheel brakes of the vehicle and at least one of the brake pressure control valves for the hydraulic unit of the antilocking brake system associated with the rear wheels of the vehicle.

3. The brake system according to claim 1, wherein the piston of the pressure modulator is a stepped piston having a first piston step forming an axially movable boundary of the modulation chamber and a second piston step larger than the first piston step forming an axially movable boundary of the control pressure space of the pressure modulator.

4. The brake system according to claim 3, wherein the antilocking brake system is operatively arranged for pump-back operation on both the front axle brake circuit and the rear axle brake circuit the pressure modulator is connected between the brake unit and a functional part of the hydraulic unit of the antilocking brake system associated with the rear axle brake circuit to the main brake pipe of the rear axle brake circuit, and brake pressure control valves individually associated with the rear wheel brakes of the vehicle are provided to control brake pressure build-up, brake pressure retention and brake pressure reduction phases of the traction control device and the electronic braking force distribution control device, and are connected between the rear wheel brakes of the vehicle and at least one of the brake pressure control valves for the hydraulic unit of the antilocking brake system associated with the rear wheels of the vehicle.

5. The brake system according to claim 1, wherein a pump-back pump of a pump-back device associated with the rear axle brake circuit is used as the pressure generation unit as part of the auxiliary pressure source whose outlet pressure is used for control purposes to subject the control pressure space of the pressure modulator to pressure, the pump-back device being operatively configured for pump-back operation in an antilocking brake system operating on both brake circuits.

6. The brake system according to claim 5, wherein the pressure modulator is a pressure transformer with a transformer ratio of 1/1.

7. The brake system according to claim 5, wherein brake fluid is employed as a working medium for the control circuit of the pressure modulator.

8. The brake system according to claim 7, wherein the pressure modulator is a pressure transformer with a transformer ratio of 1/1.

9. The brake system according to claim wherein a pressure limiting valve is operatively connected between the control pressure space of the pressure modulator and the reservoir of the auxiliary pressure source.

10. The brake system according to claim 9, wherein the antilocking brake system is operatively arranged for pump-back operation on both the front axle brake circuit and the rear axle brake circuit, the pressure modulator is connected between the brake unit and a functional part of the hydraulic unit of the antilocking brake system associated with the rear axle brake circuit to the main brake pipe of the rear axle brake circuit, and brake pressure control valves individually associated with the rear wheel brakes of the vehicle are provided to control brake pressure build-up, brake pressure retention and brake pressure reduction phases of the traction control device and the electronic braking force distribution control device, and are connected between the rear wheel brakes of the vehicle and at least one of the brake pressure control valves for the hydraulic unit of the antilocking brake system associated with the rear wheels of the vehicle.

11. The brake system according to claim 10, wherein the piston of the pressure modulator is a stepped piston having a first piston step forming an axially movable boundary of the modulation chamber and a second piston step larger than the first piston step forming an axially movable boundary of the control pressure space of the pressure modulator.

12. The brake system according to claim 1, wherein a pump-back pump of a pump-back device associated with the rear axle brake circuit is used as the pressure generation unit as part of the auxiliary pressure source whose outlet pressure is used for control purposes to subject the control pressure space of the pressure modulator to pressure, the pump-back device being operatively configured for pump-back operation in an antilocking brake system operating on both brake circuits.

13. The brake system according to claim 12, wherein brake fluid is employed as a working medium for the control circuit of the pressure modulator.

14. The brake system according to claim 1, wherein a throttle is operatively arranged in the hydraulic control path which is adapted to be opened and shut off under valve control and provides pressure feed to the control pressure space of the pressure modulator.

15. The brake system, according to claim 14, wherein the antilocking brake system is operatively arranged for pump-back operation on both the front axle brake circuit and the rear axle brake circuit, the pressure modulator is connected between the brake unit and a functional part of the hydraulic unit of the antilocking brake system associated with the rear axle brake circuit to the main brake pipe of the rear axle brake circuit, and brake pressure control valves individually associated with the rear wheel brakes of the vehicle are provided to control brake pressure build-up, brake pressure retention and brake pressure reduction phases of the traction control device and the electronic braking force distribution control device, and are connected between the rear wheel brakes of the vehicle and at least one of the brake pressure control valves for the hydraulic unit of the antilocking brake system associated with the rear wheels of the vehicle.

16. The brake system according to claim 15, wherein a pump-back pump of a pump-back device associated with the rear axle brake circuit is used as the pressure generation unit as part of the auxiliary pressure source whose outlet pressure is used for control purposes to subject the control pressure space of the pressure modulator to pressure, the pump-back device being operatively configured for pump-back operation in an antilocking brake system operating on both brake circuits.

17. The brake system according to claim 1, wherein a solenoid valve is operatively arranged between the brake unit and the pressure modulator for causing the modulation chamber of the pressure modulator to be shut off in traction control and electronic braking force distribution control operation and selectively in antilocking brake system control operation.

18. The brake system according to claim 1, wherein a signal generator operatively associated with the piston of the pressure modulator monitors the position of the piston and generates an electrical output signal characteristic of the position.

19. A hydraulic brake method for a road vehicle having a single-axle drive with a static front axle non-driven wheels brake circuit and a static rear axle driven wheels brake circuit, comprising the steps of:
   a) operating a brake system of the road vehicle, at least on the brake circuit associated with driven rear wheels in accordance with volume alteration to a pressure modulator;
   b) selectively operatively connecting and disconnecting the pressure modulator to wheel brakes of the driven wheel brake circuit and to at least one valve associated with the driven wheel brake circuit for actuating the brake system and for providing a traction control by retarding a vehicle wheel tending to spin through actuation of that vehicle wheel's associated wheel brake;
   c) subjecting a control pressure space of the pressure modulator to one of an outlet pressure of an auxiliary pressure source and to an unpressurized reservoir of the auxiliary pressure source to selectively reduce and increase a volume of a modulation chamber of the pressure modulator to effect traction control;
   d) disconnecting the modulation chamber from the brake unit when brake pressure is changed for effecting one of brake control and of the traction control the modulator and an associated modulator piston configured so that the modulation chamber can accept in a single brake pressure stroke a total brake fluid quantity to be displaced into the driven wheels brake circuit to develop a maximum brake pressure;
   e) holding the modulator piston in a non-actuated condition of the brake system, in a position corresponding to a maximum volume of the modulator chamber;
   f) disconnecting the modulator chamber from a pressure outlet of the brake unit as soon as the brake system is actuated or the traction control responds;
   g) effecting a brake pressure build-up in the driven wheels brake circuit one each braking action; and
   h) effecting a braking force distribution control via monitoring of position of the modulation piston and/or brake pressure in the driven wheels brake circuit and recording of one of brake pressure in the non-driven wheels brake circuit and the position of an element of the brake unit correlated with the non-driven wheels brake circuit brake pressure such that, in normal braking operation, the brake force distribution maintains the brake pressure in the driven wheels brake circuit in a defined relationship to the brake pressure of the non-driven wheels brake circuit.

* * * * *